US011244123B2

(12) United States Patent
Bellrose et al.

(10) Patent No.: US 11,244,123 B2
(45) Date of Patent: Feb. 8, 2022

(54) ADDRESSING ADDITIONAL MEANINGS RESULTING FROM LANGUAGE TRANSLATION

(71) Applicant: International Business Machines Corporation, Armonk, NY (US)

(72) Inventors: Schayne Bellrose, Poughkeepsie, NY (US); Pasquale A. Catalano, Wallkill, NY (US); Prach Jerry Chuaypradit, Apex, NC (US); Andrew Gerald Crimmins, Montrose, NY (US); Preston Lane, Poughkeepsie, NY (US); Michael Lapointe, Saugerties, NY (US); Francesca Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/431,931

(22) Filed: Jun. 5, 2019

(65) Prior Publication Data

US 2020/0387573 A1 Dec. 10, 2020

(51) Int. Cl.
*G06F 40/58* (2020.01)
*G06F 40/30* (2020.01)

(52) U.S. Cl.
CPC ............. *G06F 40/58* (2020.01); *G06F 40/30* (2020.01)

(58) Field of Classification Search
CPC ................................. G06F 40/58; G06F 40/30
See application file for complete search history.

(56) References Cited

U.S. PATENT DOCUMENTS

| 5,644,774 | A | 7/1997 | Fukumochi et al. |
| 7,657,421 | B2 | 2/2010 | Barnes et al. |
| 8,249,854 | B2 | 8/2012 | Nikitin et al. |
| 9,063,931 | B2 | 6/2015 | Wu |
| 9,613,022 | B2 | 4/2017 | Stewart et al. |
| 9,684,652 | B2 | 6/2017 | Connor et al. |
| 9,916,307 | B1 * | 3/2018 | Kochura ............... G06F 40/58 |
| 10,122,670 | B2 * | 11/2018 | Eck ........................ H04L 51/32 |
| 2008/0004862 | A1 * | 1/2008 | Barnes ................. G06F 40/151 704/4 |
| 2009/0119091 | A1 | 5/2009 | Sarig |

(Continued)

FOREIGN PATENT DOCUMENTS

WO 2001002994 A1 1/2001

OTHER PUBLICATIONS

Shojaei, "Translation of Idioms and Fixed Expressions: Strategies and Difficulties", Theory and Practice in Language Studies. 2.10. 4304/tpls.2.6.1220-1229. (Year: 2012).*

(Continued)

*Primary Examiner* — Michelle M Koeth
(74) *Attorney, Agent, or Firm* — Jamar K. Ray

(57) ABSTRACT

A computer-implemented method may include obtaining, by processor, a first message composed in a first language and obtaining, by the processor, a translated first message. The translated first message may include a translation of the first message from the first language to a second language. The method may further include determining, by the processor, that the translated first message includes a translation-generated additional meaning, and notifying, by the processor, the first user of the determination.

20 Claims, 5 Drawing Sheets

(56) References Cited

U.S. PATENT DOCUMENTS

| | | |
|---|---|---|
| 2009/0141873 A1 | 6/2009 | Gomes |
| 2014/0278341 A1* | 9/2014 | Ranjan .................... G06F 40/51 704/2 |
| 2018/0067927 A1 | 3/2018 | Gadepalli et al. |
| 2018/0137099 A1* | 5/2018 | Allen .................... G06F 40/253 |
| 2020/0012717 A1* | 1/2020 | Brown .................... G06F 40/58 |

OTHER PUBLICATIONS

Fazly et al., "Unsupervised Type and Token Identification of Idiomatic Expressions," Association for Computational Linguistics, vol. 35, No. 1, Copyright 2009, 44 pages.

Unknown, "Working with Google Translate," Languages Open Resources Online (LORO), Printed Feb. 12, 2019, 4 pages, https://germanstories.vcu.edu/grmn_202/Working_with_Google_Translate.pdf.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

ADDRESSING ADDITIONAL MEANINGS RESULTING FROM LANGUAGE TRANSLATION

BACKGROUND

The present disclosure relates to language translation, and more specifically, to language translation of a message using an electronic device.

Language translation tools may be used to aid in translating messages between a first language and a second language. Such tools may be implemented through software installed on an electronic device, such as a computer or a mobile phone.

SUMMARY

Some embodiments of the present disclosure can be illustrated as a computer-implemented method. The method may include obtaining, by processor, a first message composed in a first language. The method may further include obtaining, by the processor, a translated first message. The translated first message may include a translation of the first message from the first language to a second language. The method may further include determining, by the processor, that the translated first message includes a translation-generated additional meaning. The method may further include notifying, by the processor, the first user of the determination.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
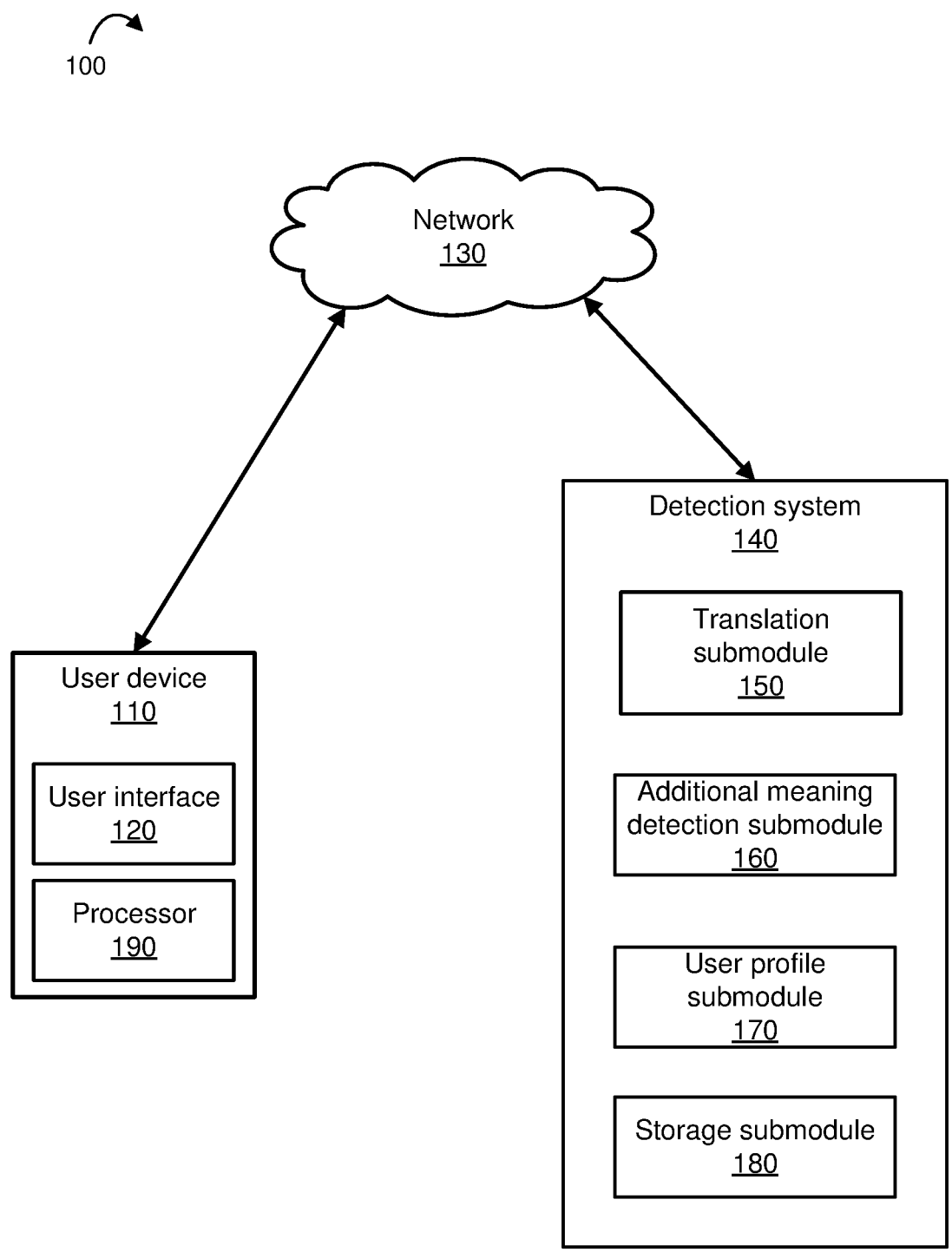
FIG. 1 depicts an example computing environment that includes a user device and a detection system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to language translation; more particular aspects relate to addressing added meanings that result from language translation. While the present disclosure is not necessarily limited to such applications, various aspects of the disclosure may be appreciated through a discussion of various examples using this context.

Messages, such as text messages and electronic mail communications, may require language translation when sent between users who speak different languages. In such cases, a message recipient may use one of a variety of available language translation tools to construe the received message. In some instances, a translation tool may produce a translated message that includes an additional meaning in the second language that is not present in the original message. Such an additional meaning may cause a misunderstanding, confusion, and/or conflict between the sender and the recipient.

To address these and other problems, embodiments of the present disclosure include a method and system for addressing a translation-generated additional meaning that may result from using a language translation tool. An "additional meaning" may be a meaning that is based on an interpretation of one or more words of a second language. An additional meaning is "translation-generated" when it is based on one or more words in the second language that were translated from a first language. Accordingly, a translation-generated additional meaning is not present in the original message; rather, it is a meaning that may result from a translation of the original message to a second language.

For example, a first coworker stationed in the United States may compose an e-mail message in English to a second coworker stationed in China. To construe the e-mail message, the second coworker may use a language translation tool to translate the e-mail message from English to Cantonese. As a result of the translation, the translated e-mail message may include a group of words that form a Cantonese idiom that adds a meaning that was not present in the original English e-mail message. In this example, the meaning of the Cantonese idiom would be a translation-generated additional meaning. Embodiments of the present disclosure may allow the first coworker in this example to identify the Cantonese idiom and modify the original e-mail message to remove the translation-generated additional meaning.

Embodiments of the present disclosure include a detection system that may detect a translation-generated additional meaning and notify a first user of its presence. In some embodiments, the detection system may be included in a processor of a user device, such as a mobile telephone. In some embodiments, the detection system may include one or more modules and/or submodules that communicate with a user device via one or more networks.

In some embodiments of the present disclosure, the detection system may obtain a first message in a first language and obtain a translation of the first message to a second language. In some embodiments, the detection system may search the translated first message for translation-generated additional meanings by comparing one or more words of the translated first message to one or more stored words that have been predetermined to include additional meanings (e.g., a database of stored idioms). In some embodiments of the present disclosure, the detection system may provide a first user a set of substitute first messages that are less likely to include a translation-generated additional meaning. In some embodiments, the detection system may implement machine learning techniques to improve its detection of translation-generated additional meanings based on evaluations obtained from at least one of a first user and a second user.

Embodiments of the present disclosure may improve communication between users who speak different languages by reducing the likelihood that an unintended meaning is added to a communicated message. Embodiments of the present disclosure may be configured to predict a preferred language of an intended message recipient; thus, a user who is composing and sending a message may benefit from the present disclosure without prior knowledge of the language(s) to which the intended recipient(s) may translate the message.

Turning to the figures, FIG. 1 illustrates an example computing environment 100 that includes a user device 110 and a detection system 140, in accordance with embodiments of the present disclosure. User device 110 may be an electronic device such as a mobile telephone, smart watch, tablet, or computing device. In some embodiments, the user device 110 may include a computer system, such as the computer system 301 shown in FIG. 3. User device 110 includes a user interface 120 and a processor 190. In some embodiments, the user interface 120 may include at least one of a display, alphanumeric keypad, microphone, speaker, and camera. In some embodiments, the processor 190 may include programming instructions to perform one or more of the method steps that are identical or substantially similar to those described in FIG. 2 below.

User device 110 may communicate with detection system 140 via one or more networks 130. In some embodiments, detection system 140 may be a computer program or application implemented on a computing device such as that shown in FIG. 3. In some embodiments, the detection system 140 includes a discrete translation submodule 150, additional meaning detection submodule 160, user profile submodule 170, and storage submodule 180. In some embodiments, submodules 150, 160, 170, and 180 may be located remote from the detection system 140. In some embodiments, submodules 150, 160, 170, and 180 may be integrated into a single device.

Translation submodule 150 may include a processor having a set of instructions to translate a message from a first language to a second language. In some embodiments, translation submodule 150 may include logic to predict a second language to which a second user may translate a message. Such a prediction may be based on personal data stored in a user profile submodule 170. The user profile submodule 170 may include a memory device storing personal data of a set of users.

Additional meaning detection submodule 160 may include a processor configured to determine whether a translated first message includes a translation-generated additional meaning. In some embodiments, the additional meaning detection submodule 160 may base such a determination on a database of word groups stored in storage submodule 180. Such word groups may be predetermined to include translation-generated additional meanings.

In some embodiments, network 130 may be a wide area network (WAN), a local area network (LAN), an internet, or an intranet. In some embodiments, the network 130 can be implemented within a cloud computing environment or using one or more cloud computing services. In some embodiments, the network 130 may be substantially similar to, or the same as, network 50 described in FIG. 4 and FIG. 5. Consistent with various embodiments, a cloud computing environment may include a network-based, distributed data processing system that provides one or more cloud computing services. Further, a cloud computing environment may include multiple computers disposed within one or more data centers and configured to share resources over the network 130.

Figure 2:
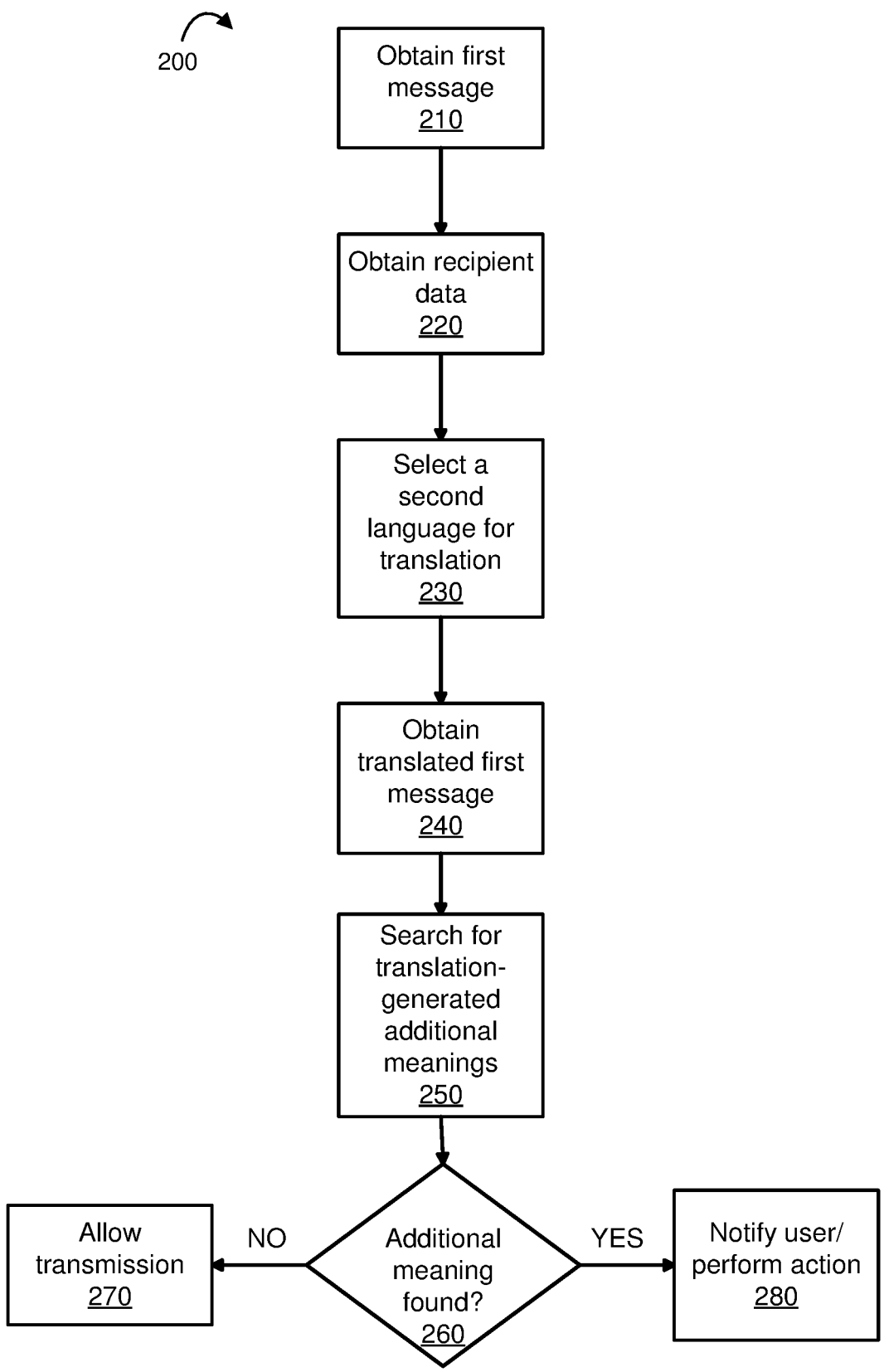
FIG. 2 depicts a flowchart of an example method for detecting a translation-generated additional meaning, in accordance with embodiments of the present disclosure.

FIG. 2 illustrates a flowchart of an example method 200 for detecting a translation-generated additional meaning, in accordance with embodiments of the present disclosure. The method 200 may be performed by a detection system, such as the detection system 140 described with respect to FIG. 1. Referring back to FIG. 2, in step 210, the detection system obtains a first message composed in a first language. For example, in some embodiments, the first message may be an email message written in English by a first user and submitted to the detection system via a computing device.

In step 220, the detection system obtains personal data corresponding to one or more intended recipients. An intended recipient may be a second user to whom a first user has composed a message. Personal data corresponding to an intended recipient may include information such as the recipient's location, preferred communication language, email address, and/or previous correspondence (e.g., previous email messages) from the recipient. In some embodiments, the detection system may obtain personal data corresponding to an intended recipient from a profile of the intended recipient stored on a memory device. In some embodiments, such as an embodiment in which a first user selects a language used to translate a message, step 220 may not be performed.

In step 230, a second language to which the first message is to be translated is selected. In some embodiments, the selection may be made manually by a first user, such as by the first user choosing a second language among a set of second-language options presented on a graphical user interface. In some embodiments, the detection system may select the second language based on a prediction of a second language to which an intended recipient will translate a first message.

For example, in some embodiments, the detection system may obtain the intended recipient's email address and identify a country code in the email address. Based on the identified country code, the detection system may predict that the intended recipient may translate the first message to a second language corresponding to the country represented by the identified country code (e.g., the detection system may predict German as the second language based on an intended recipient email address that includes "DE" as a country code). In response, the detection system may select the predicted second language (e.g., German). In some embodiments, the detection system may obtain an intended text message recipient's phone number and identify a country code from the phone number. The detection system may then predict a second language based on the phone number's country code (e.g., the detection system may predict Portuguese as the second language based on an intended recipient phone number that includes "+55" as a country code for Brazil). In response, the detection system may select the predicted second language (e.g., Portuguese). In some embodiments, the detection system may select the second language based on other personal data corresponding to an intended recipient, such as the intended recipient's office location included in a company profile.

In step 240, the detection system obtains a translated first message. The translated first message may include a translation of the first message from a first language to a second language. In some embodiments, the translated first message may include a simple translation that converts, without regard for word context, each word of a message from a first language to a second language. In some embodiments, the translated first message may be obtained from a language translation module within the detection system. In some embodiments, the translated first message may be obtained from an external translation resource, such as a website that provides language translation services.

In step 250, the detection system searches the translated first message for translation-generated additional meanings. A translation-generated additional meaning may be a meaning, not present in the first message, that is added to the translated first message as a result of the translation of the first message to a second language. The translation-generated additional meaning may be based on a meaning of a group of words in the second language.

For example, in some embodiments, the translation of the first message may result in a group of words that form an idiom in the second language, and the presence of the idiom in the translated first message may introduce a meaning that was not included in the first message. For example, in some embodiments, an English first message may be, "I will be in France next month, in the west. Maybe we can meet for lunch?" The detection system may obtain the following French translation of the first message: "Je serai en France le mois prochain, être à l'ouest. Peut-être que nous pouvons nous rencontrer pour le déjeuner?" In this translation, the group of words "être à l'ouest" forms an idiom in French that introduces the meaning, "being crazy or out of it" to the translated first message; such a meaning was not included in the first message.

In another example, in some embodiments, an English first message may include the statement, "I am full." The detection system may obtain the following French translation of the first message: "je suis plein," which may be understood as "je suis enceinte" and introduce the meaning, "I am pregnant" to the translated first message; such a meaning was not included in the first message.

Step 250 may include the detection system using one or more methods to search for a translation-generated additional meaning. In some embodiments, the detection system may compare one or more words of the translated first message to one or more words stored in a database of additional meanings in the corresponding second language. For example, the detection system may search for a match between a group of words of the translated first message and groups of words stored in a database of idioms in the second language. In some embodiments, the detection system may obtain an analysis of the translated first message from an external resource, such as a website, that is configured to search for a translation-generated additional meaning.

In step 260, the detection system determines whether a translation-generated additional meaning has been detected. If a translation-generated additional meaning has been detected, then, in step 280, the detection system notifies the first user. For example, in some embodiments, such a notification to a first user may include displaying a message to the first user via a graphical user interface.

In some embodiments, step 280 may include presenting the first user a set of substitute first messages. A substitute first message may be a first message whose wording has been modified such that the modified wording is less likely to include a translation-generated additional meaning. For example, continuing with the first example above, the detection system may present the first user a substitute first message such as, "I will be in western France next month. Maybe we can meet for lunch?" Such a substitute first message may not include the translation-generated additional meaning discussed above.

In some embodiments, step 280 may include prompting the first user to either select or provide a substitute first message. Once that substitute first message is obtained, the detection system may repeat steps 240 through 260 to translate the substitute first message to a second language and determine whether a translation-generated additional meaning is present in the translated substitute first message.

In some embodiments, step 280 may include steps to train the detection system. For example, in step 280, the detection system may obtain an evaluation of a set of substitute first messages from a first user. Such an evaluation may include a value, such as a numerical rating, used to rank the set of substitute messages according to the first user's most preferred substitute first message and the first user's least preferred substitute first message. In some embodiments, step 280 may include the detection system providing the translated first message and/or the translated substitute first message to a second user, such as an intended recipient, and obtaining an evaluation, similar to that discussed above, from the second user. Based on one or more evaluations obtained by the detection system, the detection system may implement machine learning techniques to improve its detection of translation-generated additional meanings and/or improve a set of substitute first messages presented to the first user during subsequent uses of the detection system.

If a translation-generated additional meaning has not been detected, then in step 270, the detection system may allow the first message to be transmitted to the intended recipient. In some embodiments, this may entail the detection system transmitting the first message.

Figure 3:
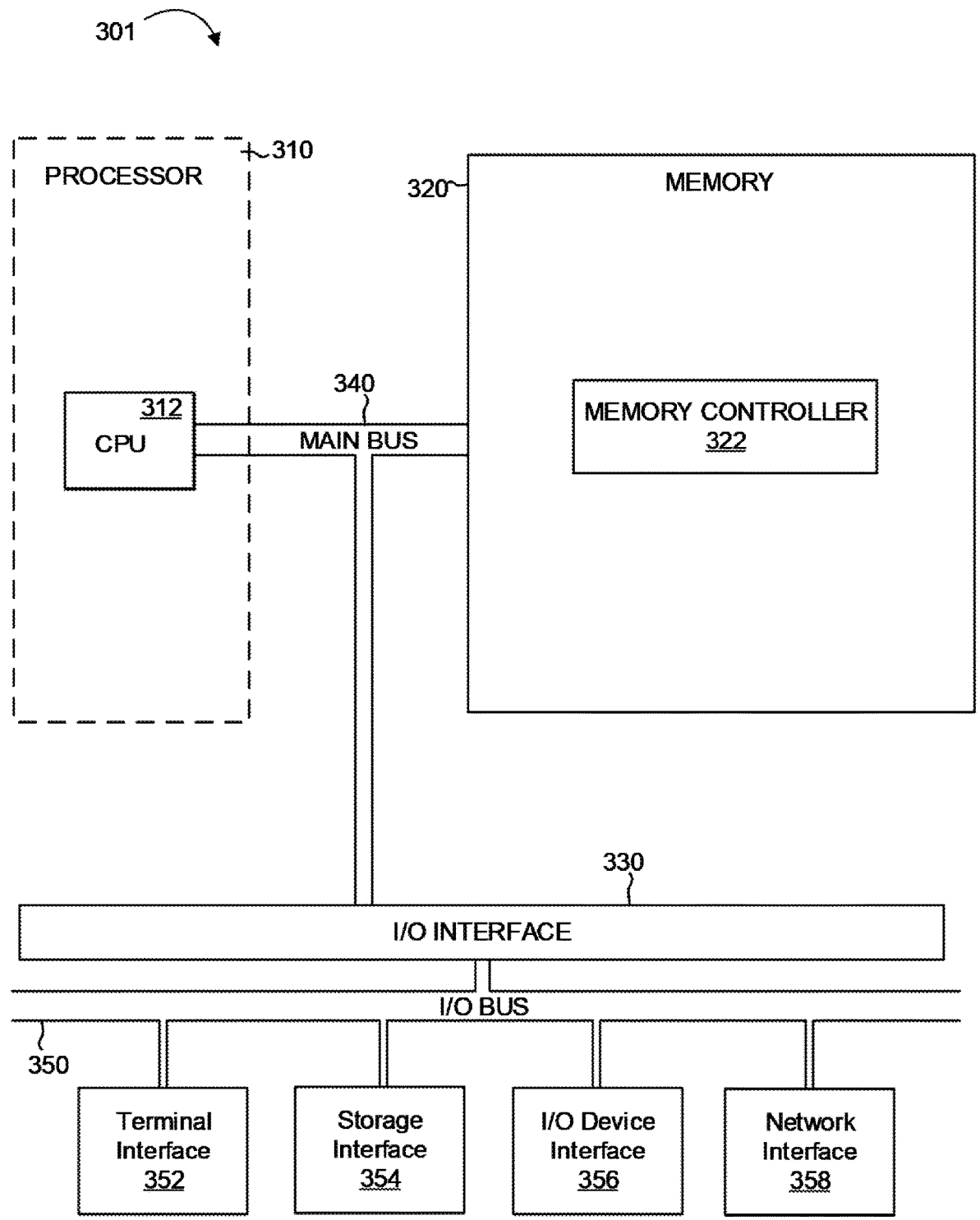
FIG. 3 depicts the representative major components of a computer system that may be used in accordance with embodiments of the present disclosure.

FIG. 3 depicts the representative major components of an exemplary Computer System 301 that may be used in accordance with embodiments of the present disclosure. The particular components depicted are presented for the purpose of example only and are not necessarily the only such variations. The Computer System 301 may comprise a Processor 310, Memory 320, an Input/Output Interface (also referred to herein as I/O or I/O Interface) 330, and a Main Bus 340. The Main Bus 340 may provide communication pathways for the other components of the Computer System 301. In some embodiments, the Main Bus 340 may connect to other components such as a specialized digital signal processor (not depicted).

The Processor 310 of the Computer System 301 may be comprised of one or more CPUs 312. The Processor 310 may additionally be comprised of one or more memory buffers or caches (not depicted) that provide temporary storage of instructions and data for the CPU 312. The CPU 312 may perform instructions on input provided from the caches or from the Memory 320 and output the result to caches or the Memory 320. The CPU 312 may be comprised of one or more circuits configured to perform one or methods consistent with embodiments of the present disclosure. In some embodiments, the Computer System 301 may contain multiple Processors 310 typical of a relatively large system. In other embodiments, however, the Computer System 301 may be a single processor with a singular CPU 312.

The Memory 320 of the Computer System 301 may be comprised of a Memory Controller 322 and one or more memory modules for temporarily or permanently storing data (not depicted). In some embodiments, the Memory 320 may comprise a random-access semiconductor memory, storage device, or storage medium (either volatile or non-volatile) for storing data and programs. The Memory Controller 322 may communicate with the Processor 310, facilitating storage and retrieval of information in the memory modules. The Memory Controller 322 may communicate with the I/O Interface 330, facilitating storage and retrieval of input or output in the memory modules. In some embodiments, the memory modules may be dual in-line memory modules.

The I/O Interface 330 may comprise an I/O Bus 350, a Terminal Interface 352, a Storage Interface 354, an I/O Device Interface 356, and a Network Interface 358. The I/O Interface 330 may connect the Main Bus 340 to the I/O Bus 350. The I/O Interface 330 may direct instructions and data from the Processor 310 and Memory 320 to the various interfaces of the I/O Bus 350. The I/O Interface 330 may also direct instructions and data from the various interfaces of the I/O Bus 350 to the Processor 310 and Memory 320. The various interfaces may comprise the Terminal Interface 352, the Storage Interface 354, the I/O Device Interface 356, and the Network Interface 358. In some embodiments, the various interfaces may comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—may communicate failures and changes to one or more components to a hypervisor or operating system (not depicted). The hypervisor or the operating system may allocate the various resources available in the Computer System 301 and track the location of data in Memory 320 and of processes assigned to various CPUs 312. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
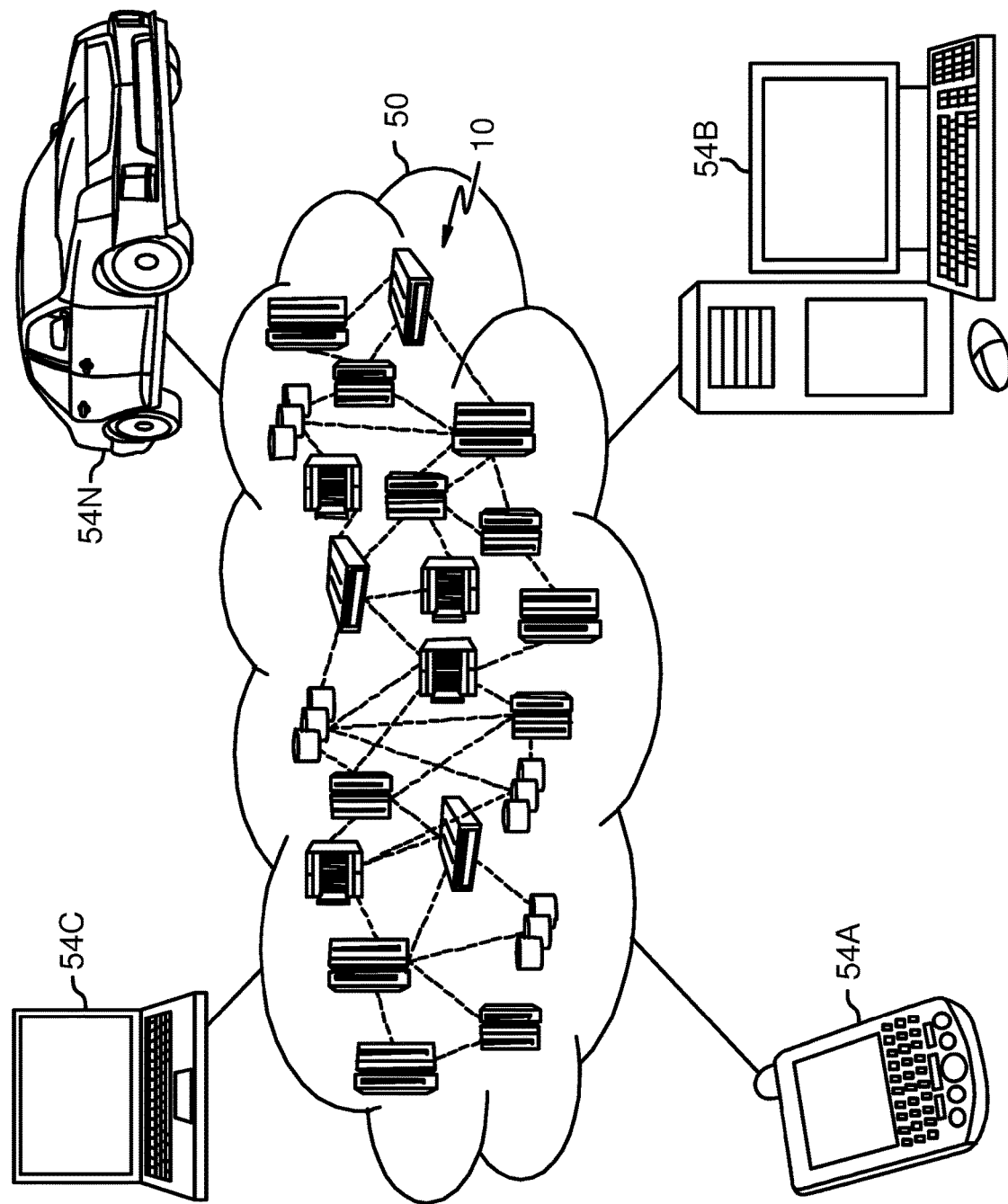
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
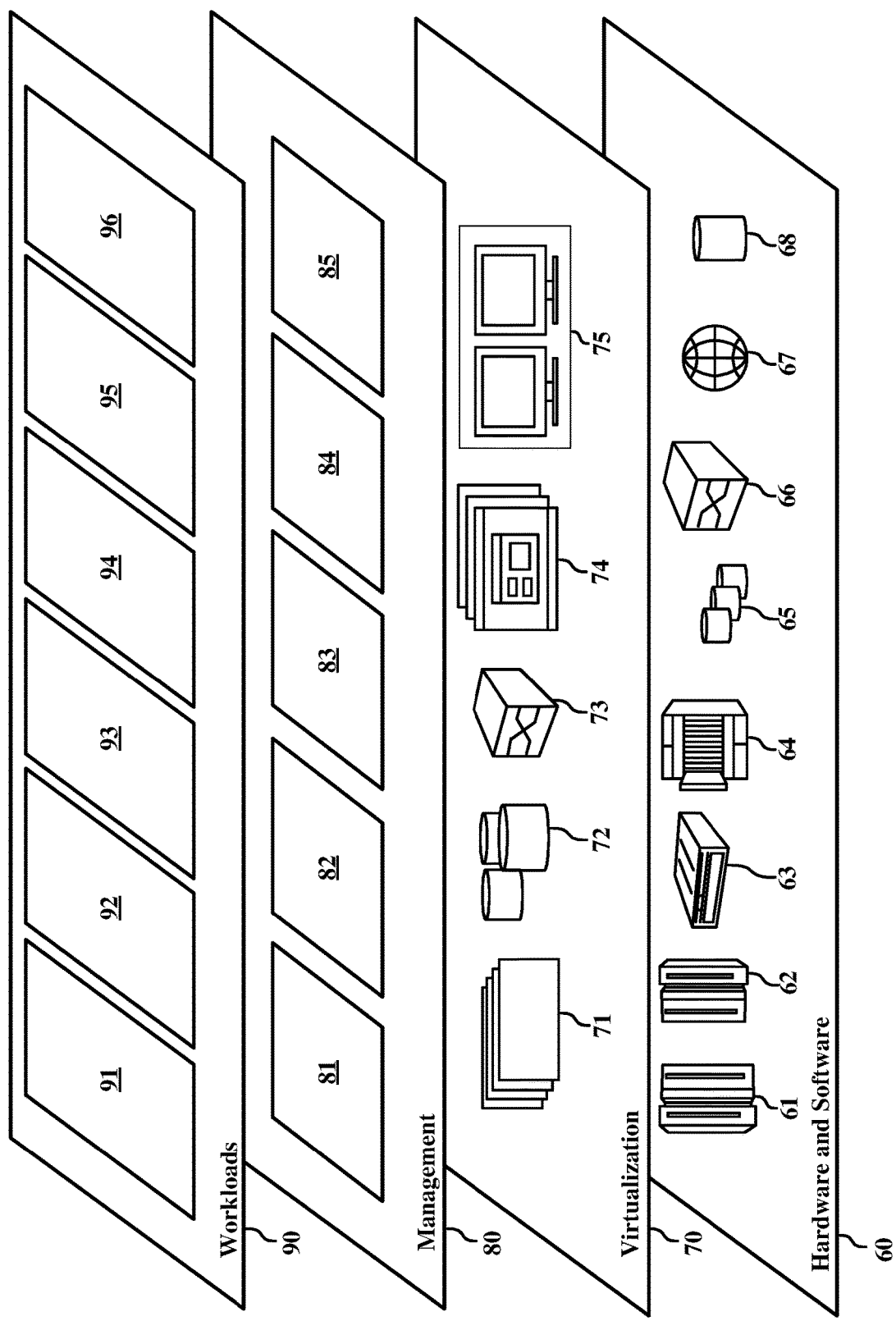
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and additional meaning detection logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by a processor, a first message of a first user comprising a first set of words in a first language;
obtaining, by the processor, a translated first message comprising a second set of words in a second language,
wherein the translated first message includes a language translation of the first set of words to the second set of words;
determining, by the processor and by searching for a match between one or more words of the translated first message and one or more words stored in a database of idioms in the second language, that the second set of words includes a translation-generated idiom that:
is based on the second set of words in the second language,
results from the language translation, and
is not included in the first set of words;
providing, by the processor and in response to the determining, a set of substitute messages in the first language comprising:
a first substitute message comprising a first modification to the first set of words;
obtaining, by the processor, a substitute language translation of the first substitute message to the second language;
determining, by the processor, that the substitute language translation does not include the translation-generated idiom; and
in response to the determining that the substitute language translation does not include the translation-generated idiom, transmitting, by the processor, the substitute language translation to a second user.

2. The method of claim 1, wherein the obtaining the translated first message comprises selecting the second language, and
wherein the selecting the second language comprises predicting that the second language corresponds to the second user.

3. The method of claim 2, wherein the predicting comprises obtaining data from a user profile of the second user.

4. A system comprising:
a processor; and
a memory in communication with the processor, the memory containing program instructions that, when executed by the processor, are configured to cause the processor to perform a method, the method comprising:
obtaining a first message of a first user comprising a first set of words in a first language;
obtaining a translated first message comprising a second set of words in a second language, wherein the translated first message includes a language translation of the first set of words to the second set of words;
determining, by searching for a match between one or more words of the translated first message and one or more words stored in a database of idioms in the second language, that the second set of words includes a translation-generated idiom that:
is based on the second set of words in the second language,
results from the language translation, and
is not included in the first set of words;
providing, in response to the determining, a set of substitute messages in the first language comprising:
a first substitute message comprising a first modification to the first set of words;
obtaining a substitute language translation of the first substitute message to the second language;
determining that the substitute language translation does not include the translation-generated idiom; and
in response to the determining that the substitute language translation does not include the translation-generated idiom, transmitting the substitute language translation to a second user.

5. The system of claim 4, wherein the obtaining the translated first message comprises selecting the second language, and
wherein the selecting the second language comprises predicting that the second language corresponds to the second user.

6. The method of claim 1, wherein the set of substitute messages further comprises a second substitute message comprising a second modification to the first set of words,
wherein the method further comprises:
obtaining, by the processor, a first evaluation by the first user of the set of substitute messages; and
modifying, by the processor and based on the first evaluation, the set of substitute messages.

7. The method of claim 6, wherein the first evaluation comprises a ranking by the first user of the set of substitute messages.

8. The method of claim 6, further comprising:
obtaining, by the processor, a second evaluation by the second user of the substitute language translation,
wherein the modifying is further based on the second evaluation.

9. The method of claim 8, further comprising:
providing, by the processor, the translated first message to the second user, and
obtaining, by the processor, a third evaluation by the second user of the translated first message,
wherein the modifying is further based on the third evaluation.

10. The system of claim 5, wherein the predicting comprises obtaining data from a user profile of the second user.

11. The system of claim 4, wherein the set of substitute messages further comprises a second substitute message comprising a second modification to the first set of words,
wherein the method further comprises:
obtaining a first evaluation by the first user of the set of substitute messages; and
modifying, based on the first evaluation, the set of substitute messages.

12. The system of claim 11, wherein the first evaluation comprises a ranking by the first user of the set of substitute messages.

13. The system of claim 11, the method further comprising:
obtaining a second evaluation by the second user of the substitute language translation,
wherein the modifying is further based on the second evaluation.

14. The system of claim 13, the method further comprising:
providing the translated first message to the second user, and
obtaining a third evaluation by the second user of the translated first message,
wherein the modifying is further based on the third evaluation.

15. A computer program product, the computer program product comprising a computer readable storage medium having program instructions embodied therewith, the program instructions executable by a computer to cause the computer to perform a method, the method comprising:
obtaining a first message of a first user comprising a first set of words in a first language;
obtaining a translated first message comprising a second set of words in a second language, wherein the translated first message includes a language translation of the first set of words to the second set of words;
determining, by searching for a match between one or more words of the translated first message and one or more words stored in a database of idioms in the second language, the second set of words includes a translation-generated idiom that:
is based on the second set of words in the second language,
results from the language translation, and
is not included in the first set of words;
providing, in response to the determining, a set of substitute messages in the first language comprising:
a first substitute message comprising a first modification to the first set of words;
obtaining a substitute language translation of the first substitute message to the second language;
determining that the substitute language translation does not include the translation-generated idiom; and
in response to the determining that the substitute language translation does not include the translation-generated idiom, transmitting the substitute language translation to a second user.

16. The computer program product of claim 15, wherein the obtaining the translated first message comprises selecting the second language, and
wherein the selecting the second language comprises predicting that the second language corresponds to the second user.

17. The computer program product of claim 15, wherein the set of substitute messages further comprises a second substitute message comprising a second modification to the first set of words,
wherein the method further comprises:
obtaining a first evaluation by the first user of the set of substitute messages; and
modifying, based on the first evaluation, the set of substitute messages.

18. The computer program product of claim 17, wherein the first evaluation comprises a ranking by the first user of the set of substitute messages.

19. The computer program product of claim 17, the method further comprising:
obtaining a second evaluation by the second user of the substitute language translation,
wherein the modifying is further based on the second evaluation.

20. The computer program product of claim 19, the method further comprising:
providing the translated first message to the second user, and
obtaining a third evaluation by the second user of the translated first message,
wherein the modifying is further based on the third evaluation.

* * * * *